(12) United States Patent
Martin et al.

(10) Patent No.: US 7,842,148 B2
(45) Date of Patent: Nov. 30, 2010

(54) METHOD FOR DETERMINING THE OPERATING PARAMETERS OF A DEVICE FOR LAYING A THREAD BY PROJECTION

(75) Inventors: Pascal Martin, Corent (FR);
Jean-François Verjat, Issoire (FR);
Dominique Cordaillat, Brindas (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 596 days.

(21) Appl. No.: 11/982,502

(22) Filed: Nov. 1, 2007

(65) Prior Publication Data

US 2008/0121346 A1       May 29, 2008

(30) Foreign Application Priority Data

Nov. 2, 2006   (FR)   ................................... 06 09645

(51) Int. Cl.
*D04H 3/04*   (2006.01)
(52) U.S. Cl. ........................ 156/117; 156/181; 156/397
(58) Field of Classification Search ................ 156/117, 156/121, 123–124, 130, 166, 177–179, 181, 156/397, 441
See application file for complete search history.

(56) References Cited

U.S. PATENT DOCUMENTS 3,894,906 A    7/1975  Pearce et al.
4,952,259 A *  8/1990  Debroche et al. ........... 156/117
5,951,815 A *  9/1999  Debroche .................... 156/397

FOREIGN PATENT DOCUMENTS

EP           0 248 301           12/1987
EP           0 845 348           11/1997

* cited by examiner

*Primary Examiner*—Jeff Aftergut
*Assistant Examiner*—David Simmons
(74) *Attorney, Agent, or Firm*—Cohen Pontani Lieberman & Pavane LLP

(57) ABSTRACT

A method for determining the operating parameters of a device for manufacturing a reinforcement from a thread (1) laid directly in its final position by projecting lengths of thread (10) onto a receiving surface (S). The device includes an assembly comprising a rotary conduit (2) of given length B and of longitudinal axis bb' fixed to a shaft (20) of axis R constituting the axis of rotation of the conduit, so that the outer radial end of the conduit is directed substantially radially with respect to the axis of rotation, the conduit receiving the thread (1) via its central end, which is the opposite end to the outer radial end, from the feed means, the thread leaving via the outer radial end, feed means for feeding thread (1) from a source of thread, the feed means controlling the linear rate of advance of the thread inside the rotary conduit, means for rotating the conduit at a speed Ω about the axis R, the conduit running in a plane of rotation P forming an angle θ with the longitudinal direction of the receiving surface, and thread cutting means (24, 31), wherein the angle $\beta_c$ formed by the conduit and a direction of the plane P at the time that the length of thread is cut is determined in such a way that the initial contact between the length of thread and the receiving surface S is one third of the way from the rear of the length.

8 Claims, 3 Drawing Sheets

METHOD FOR DETERMINING THE OPERATING PARAMETERS OF A DEVICE FOR LAYING A THREAD BY PROJECTION

RELATED APPLICATIONS

This application claims the priority of French application no. 06/09645 filed Nov. 2, 2006, the entire content of which is hereby incorporated by reference

FIELD OF THE INVENTION

The invention relates in particular to the manufacture of tires and is more precisely concerned with the manufacture of reinforcements.

BACKGROUND OF THE INVENTION

Known in the prior art is a manufacturing method in which such reinforcements are made directly on a part of a tire being manufactured from a continuous thread by projecting the said thread in the manner of a whip rather than in the form of plies that are incorporated when the tire is being assembled.

The term "thread" is to be understood in its broadest sense, covering a monofilament, a multifilament, a twisted cord or a folded yarn or equivalent assembly, this irrespective of the material of which the yarn is made or the treatment it may undergo, for example a surface treatment to encourage it to bond closely with rubber, or alternatively a rubberizing treatment encasing the said thread in a coat of rubber to allow it to adhere directly to the support when it is projected.

A device such as this is described in publication EP 248 301. FIG. 1 illustrates the main components which make up this type of apparatus.

The thread 1 is introduced into the device from a supply source (not depicted). The apparatus projects lengths of thread 10 onto a receiving surface S which may with equal preference be formed by the crown region of a tire being manufactured or by a separate support ring or, alternatively still, by a flat surface.

The device comprises:
feed means 11 for feeding thread 1 from a source of thread,
a rotary conduit 2 fixed to a shaft 20 constituting the axis of rotation R of the conduit, so that the outer radial end 21 of the conduit is directed substantially radially with respect to the axis of rotation, the conduit receiving the thread 1 via its central end 22, which is the opposite end to the outer radial end 21, from the feed means, the thread leaving via the outer radial end, the feed means controlling the linear rate of advance of the thread inside the rotary conduit,
means for rotating the rotary conduit, and
thread cutting means (31, 24) acting on the thread in such a way as to release a length 10 for each revolution of the rotary conduit.

This device may further comprise a thread guide 4, to receive and guide lengths of thread, as described in publication EP 248 301, or alternatively in publication EP 845 348.

The method described in publication EP 248 301 has, as its subject, a method for producing a tire reinforcement, the reinforcement comprising adjacent and substantially parallel lengths of thread 10, in which each length of thread 10 is projected individually into its position on a receiving surface S. The lengths of thread 10 are projected by rotating means 5, the receiving surface and the thread having self-stick properties.

The rotating means 5 comprise
feed means 11 for feeding thread 1 from a source of thread,
a rotary conduit 2 of given length fixed to a shaft 20 of axis R constituting the axis of rotation of the said conduit, so that the outer radial end 21 of the said conduit is directed substantially radially with respect to the axis of rotation, the said conduit receiving the thread 1 via its central end 22 which is the opposite end to the said outer radial end 21 arriving from the said feed means, the said thread leaving via the said outer radial end, the said feed means controlling the linear rate of advance of the thread inside the said rotary conduit,
means for rotating the said rotary conduit, and
thread cutting means (24, 31).

Hence, for further details regarding the device and the method of known type, it is suggested that the aforementioned publications be consulted.

Nonetheless it has become evident that, in practice, it is often difficult to operate this type of apparatus because of the large number of adjusting means and the high impact that variations in these have on the quality of the reinforcements produced.

SUMMARY OF THE INVENTION

One aspect of the invention is concerned with determining the operating parameters of a device of the known type in such a way as to give the length of thread 10 an optimum airborne path liable to lead the length onto the receiving surface in such a way as to ensure that it is laid uniformly and precisely.

It has been found experimentally that certain parameters can be considered to be of prime importance and that a careful choice of the adjustment of the means that influence these parameters can prove to be a prerequisite to optimizing the operating conditions of other parts of the apparatus.

DETAILED DESCRIPTION OF THE DRAWINGS

By convention, it is proposed that the following annotations be used to described the main parameters of the device.

The line of the intersection of the meridian plane of the receiving surface S with the surface is denoted M. When the receiving surface is formed by the crown region of the tire being manufactured, this meridian plane coincides with the meridian plane of the tire and the line M corresponds to the centre of the receiving surface in the longitudinal direction.

The plane in which the rotary conduit 2 rotates and, therefore, the plane in which the thread and the length of thread are driven will be denoted by the reference P. This plane is commonly known as the plane of whipping or of rotation. The rotary conduit through which the thread runs has an axis bb'. The line of this plane on the receiving surface also determines the line along which the length of thread is intended to "land". This line may be a straight line, if the receiving surface is a plane, or may have a convex shape if the receiving surface is formed by the crown region of a tire. The position of the laying device and its centre of rotation R, together with the movements in the plane of rotation P may be identified using an orthonormal reference system OX, OY.

The rotational speed of the arm about its axis R is denoted by the reference Ω. This axis of rotation is perpendicular to the plane P.

The useful length of rotary conduit between the axis of rotation and the point at which the length and the thread are separated is denoted B.

The length of the length of thread which is projected onto the receiving surface is denoted L. For each revolution of the conduit, the feed means therefore delivers a length of thread equal to L. This length is dictated by the architecture of the tire that is to be produced. The length of thread comprises a rear part which is that part of the length which lies at the cutting means end, and at the same end as the end 21 of the conduit 2, and a front part, which is that part of the length radially furthest from the end 21 of the conduit 2. The middle of the length 10 is denoted by the reference m.

Figure 3:
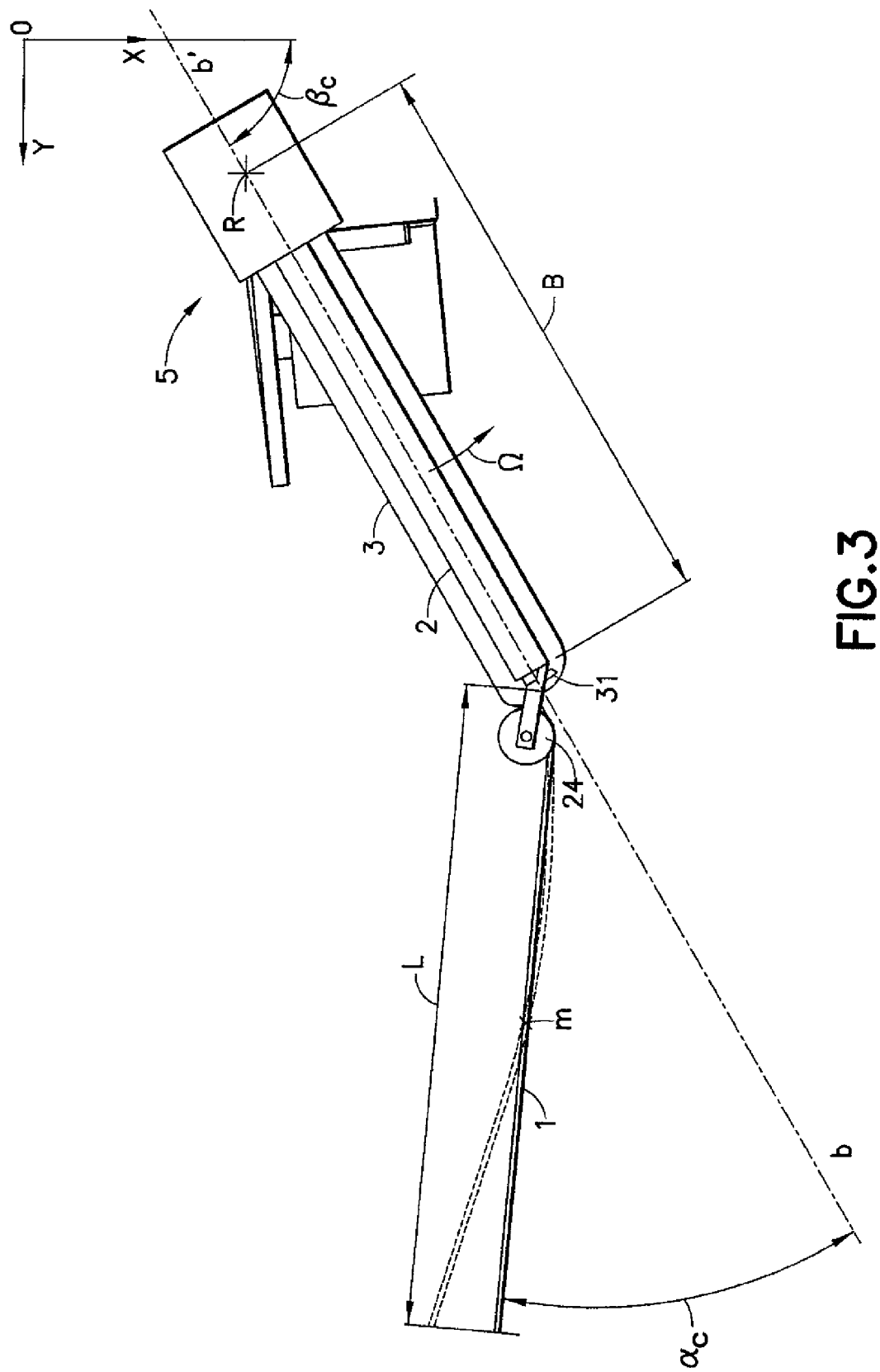
FIG. 3 shows a view of the device at the time the thread is cut, just before the length of thread is formed.

As the thread is played out, it can be seen that it adopts a substantially straight shape under the effect of centrifugal force. It can also be seen that the thread makes an angle with the axis bb' of the conduit. The angle formed by the thread 1 with the axis bb' at the time the thread is cut, just before the length of thread 10 is formed, is denoted $\alpha_c$. This angle is also known by the term of whip angle. It is nonetheless possible, when the thread density is relatively low, as it is for example with textile threads, for the shape of thread not to be entirely straight. This is because, under the effect of the speed, the effects of friction between the thread and the air become appreciable, particularly at the front end of the length. Under these conditions, the angle $\alpha_c$ is evaluated by measuring the angle formed by the straight line passing through the middle m of the length and the axis of the conduit as illustrated in FIG. 3 with the line of a thread shown in dotted line passing through the point m.

The angle formed by the axis bb' with a direction of the plane P at the precise moment the thread is cut (in this instance, the direction OX), is denoted $\beta_c$. This angle is also known as the cutting advance.

Finally, the angle θ denotes the angle at which the length of thread is laid on the receiving surface and generally corresponds to the angle formed by the thread with the longitudinal direction of the tire.

Figure 1:
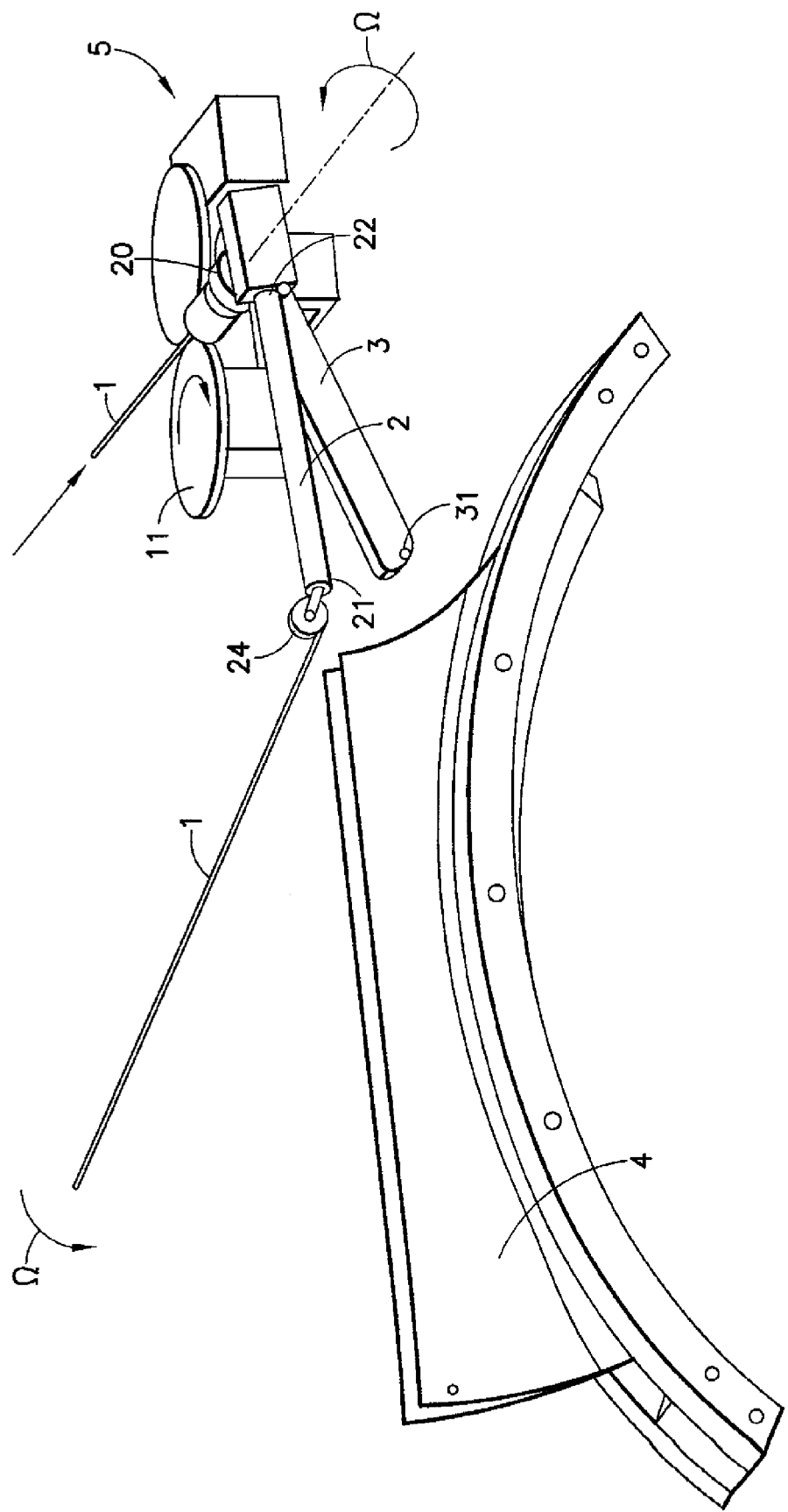
FIG. 1 illustrates a known apparatus.
Figure 2:
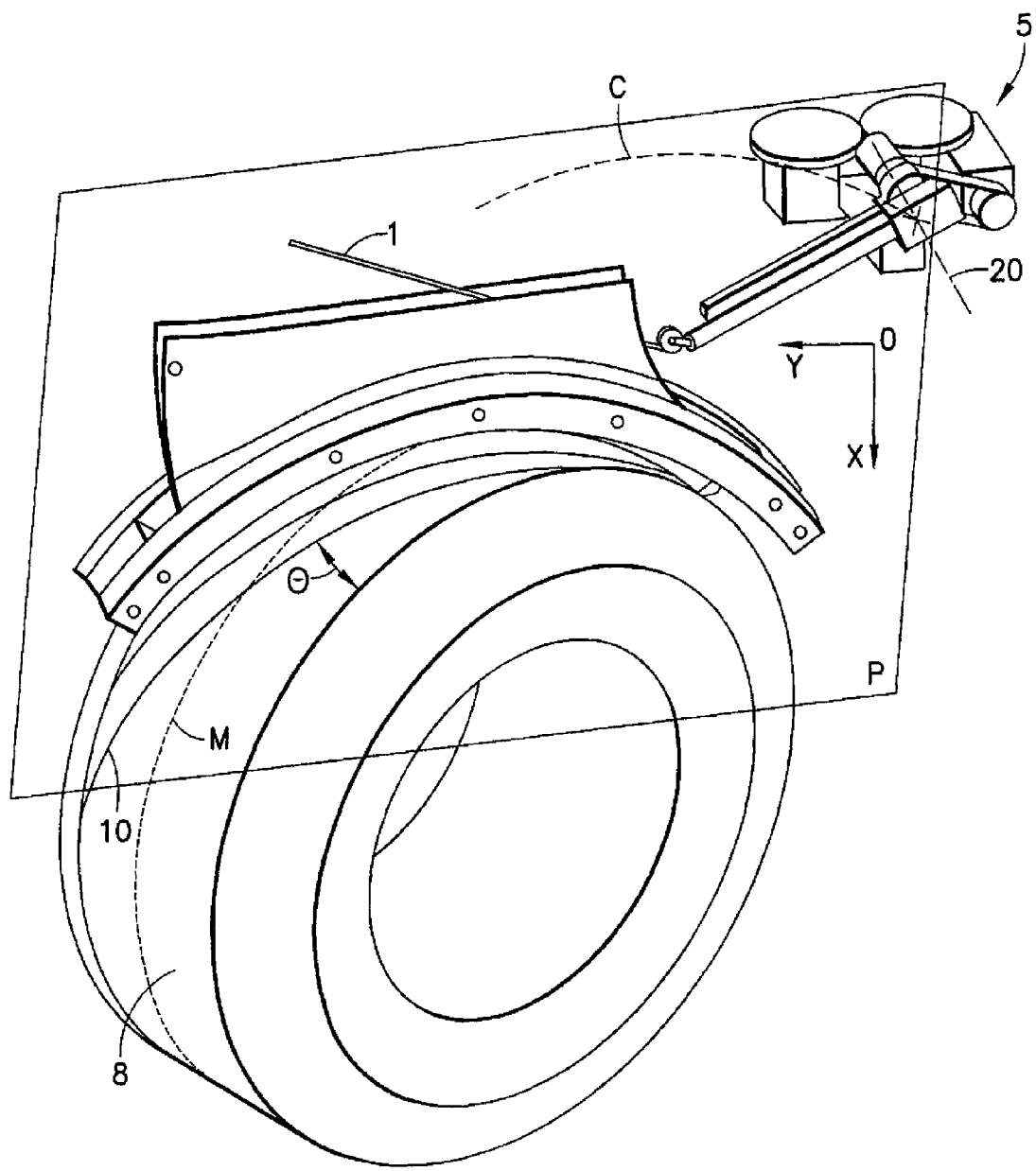
FIG. 2 shows a general overview of the device and of its orientation with respect to a receiving surface formed by the crown region of a tire.

It is known from documents of the prior art that one of the primary conditions to be satisfied is for the plane P to be orientated according to the angle θ at which the lengths of thread are laid on the receiving surface. The angle θ is dictated by the architecture of the tire. Thus, the laying device 5 may be installed on a support that is orientable with respect to the receiving surface or, as an alternative, the receiving surface may also be orientated with respect to the laying device 5. This last configuration is illustrated in FIG. 2.

FIG. 3 depicts the device viewed in the plane P in which all the movements from now on will be effected.

The person skilled in the art will know, by following the teachings of earlier publications, how to position the laying device 5 in the free space of the plane P in such a way that, on the one hand, the moving parts do not strike the stationary elements such as the receiving surface or the thread guide and, on the other hand, when the conduit is rotating, the arm runs within the confines of the plane in which the thread will whip the receiving surface S.

In a first approach, the laying device 5 may be positioned in such a way that the shortest distance between the receiving surface and the point in the path along which the end 21 of the conduit closest to the receiving surface runs is shorter than the length L of the length to be laid. This distance may even be very much shorter than the length L and close to a zero value, provided that certain conditions are observed, as will be explained hereinafter.

The most important parameter that has to be determined is the value of the angle $\beta_c$. This is because the value of the cutting advance directly determines the angle at which the length of thread "lands" on the receiving surface. It has been demonstrated experimentally that optimum operation is achieved when initial contact between the length of thread 10 and the receiving surface S is one third of the way from the rear of the said length. In other words, the length of thread needs to be lifted up at the front at the time that it "lands", just like an aeroplane.

In order to ensure that these conditions are met, it is possible to employ the aid of a visualizing means, such as a stroboscope, or alternatively of a photosensitive recording means such as a high-speed image-analysis camera which makes it possible experimentally to determine the initial point of contact between the length of thread and the receiving surface and to assess the angle at which the thread is laid on the receiving surface. The cutting advance is then modified accordingly by adjusting the cutting means control mechanism.

As will be seen hereinafter, it is of little importance, at this stage in determining the parameters of the laying method, that the length of thread is poorly centred or that laying may be considered to be uneven.

Still according to the invention, it has been demonstrated that the value of the angle $\alpha_c$ is also a determining factor in obtaining uniform laying of the thread, so as to make the laying of the length of thread on a receiving surface using a device like the one described in the afore-referenced publication EP 248 301 reliable and repeatable.

It has been demonstrated, again experimentally, that it is necessary to ensure that the value of the whip angle ranges between 35° and 65° C.

This is because it is found that when the whip angle is smaller than 35°, the uniformity with which the rear end of the thread is laid can be adversely affected and that also, difficulties are encountered in making the rear part of the length of thread adhere to the receiving surface. When the whip angle is too high and higher than 65°, the uniformity with which the front part of the length of thread is laid is adversely affected.

To adjust the value of this angle all that is required is to vary the length B of the conduit 2.

The whip angle at the time of cutting is evaluated using the same visualizing means as are used to determine the cutting advance.

If the length of the conduit is adjusted once the cutting advance has been determined it is possible that it will be necessary for the value of the said cutting advance to be modified once again in order to comply with the criterion relating to the way in which the length of thread "lands" on the receiving surface and as described in the foregoing paragraphs regarding this feature.

An iterative procedure is therefore adopted until such point as the values of these two angles lie within the indicated ranges and allow the desired effects to be obtained.

The rotational speed Ω or the density of the thread are also, but to a lesser extent, factors liable to influence the value of the whip angle. When it is considered that the density of the thread is a value dictated by the architecture of the tire, it is possible to vary the rotational speed in order to effect a fine adjustment on the value of the whip angle $\alpha_c$ when there is no desire to change the value $\beta_c$ of the cutting advance or the length of the conduit again when close to the upper and lower limits of the whip angle.

By way of indication, the following values were obtained experimentally:

| Length B of the conduit | Length L of the length of thread | Whip angle $\alpha_c$ | Rotational speed $\Omega$ | Thread density |
|---|---|---|---|---|
| B = 50 mm | L = 100 mm | 36° | 6000 rpm | 1.3 g/m |
| B = 50 mm | L = 200 mm | 60° | 6000 rpm | 1.3 g/m |
| *B = 50 mm* | *L = 300 mm* | *84°* | *6000 rpm* | *1.3 g/m* |
| *B = 100 mm* | *L = 100 mm* | *19°* | *6000 rpm* | *1.3 g/m* |
| B = 100 mm | L = 200 mm | 37° | 6000 rpm | 1.3 g/m |
| B = 100 mm | L = 300 mm | 56° | 6000 rpm | 1.3 g/m |
| B = 150 mm | L = 300 mm | 45° | 2500 rpm | 2 g/m |
| *B = 250 mm* | *L = 320 mm* | *33°* | *3000 rpm* | *2 g/m* |
| *B = 200 mm* | *L = 650 mm* | *83°* | *2500 rpm* | *1.3 g/m* |
| B = 300 mm | L = 650 mm | 57° | 2500 rpm | 1.3 g/m |

The values shown in italic type are values for which the laying results were not deemed to be acceptable for the reasons given above.

In order to complete the adjustments of the method, and when the values of the cutting advance and of the whip angle are within the desired limits, it is necessary to ensure that the centre m of the length of thread is positioned on the line M of the intersection of the meridian plane of the receiving surface S with the said receiving surface. In other words, it is necessary that the length of thread once laid is centred with respect to the longitudinal direction of the receiving surface.

To do this, the laying device 5 is moved in the plane P tangentially along a line substantially homothetic with the intersection of the plane P with the laying surface S. This line is depicted in FIG. 2 and denoted by the reference C.

By performing this movement tangentially to the line C the relative value of the angle $\beta_c$ can be altered. This should not be able to affect the value of the angle of incidence of the length of thread with respect to the receiving surface, but should it prove necessary to do so, it is still possible to correct the value of the cutting advance once again, albeit slightly. The procedure will then be as indicated in the above paragraphs, while at the same time also making sure that the centring of the length of thread has not been altered.

Thus, according to an embodiment of the invention, all that is required is action on a small number of parameters in order to determine the optimum operating conditions for the method. Knowing which parameters have the greatest influence, the person skilled in the art will have no difficulty in performing any iterations needed and in obtaining laying conditions that will allow the reinforcement of the crown region of a tire or a reinforcing ply to be produced that meets the construction rules defined by the architecture of the tire or of the ply while at the same time conforming to the manufacturing tolerances needed to achieve the required quality criteria.

The invention claimed is:

1. A method for determining operating parameters of a device for manufacturing a reinforcement from a thread (1) laid directly in its final position by projecting lengths of thread (10) onto a receiving surface (S), wherein the device includes an assembly comprising:

a rotary conduit (2) of given length B and of longitudinal axis bb' fixed to a shaft (20) of axis R constituting the axis of rotation of said conduit, so that the outer radial end (21) of said conduit is directed substantially radially with respect to the axis of rotation, said conduit receiving the thread (1) via its central end (22), which is the opposite end to said outer radial end (21), from said feed means, the thread leaving via said outer radial end;

feed means (11) for feeding thread (1) from a source of thread, said feed means controlling the linear rate of advance of the thread inside said rotary conduit (2);

means for rotating said conduit at a speed $\Omega$ about the axis R, said conduit running in a plane of rotation P; and thread cutting means (24, 31), wherein the angle $\beta_c$ formed by the rotary conduit (2) and a direction (OX) of the plane P at the time that the length of thread is cut is determined in such a way that the initial contact between the length of thread (10) and the receiving surface S is one third of the way from the rear of said length.

2. The method according to claim 1, in which the length B of the rotary conduit (2) is varied in such a way that the angle $\alpha_c$ formed by the thread 1 with the axis bb' at the time the thread is cut ranges between 35° and 65°.

3. The method according to claim 2, in which the rotational speed $\Omega$ is also varied in order to vary the angle $\alpha_c$.

4. The method according to claim 1, in which the laying device is moved in the plane of rotation P in order to center the length of thread (10) on the receiving surface S.

5. The method according to claim 1, in which the device is moved tangentially along a line substantially homothetic with the intersection of the plane P with the laying surface S.

6. The method according to claim 1, providing a visualizing means for evaluating the respective positions of the conduit and of the thread at the time of cutting, and the relative positions of the length of thread (10) and of the laying surface S at the time of initial contact between the length of thread and the laying surface.

7. The method according to claim 6, in which the visualizing means is a stroboscopic means.

8. The method according to claim 6, in which the visualizing means is a photosensitive recording means.

* * * * *